A. J. STRETCH.
HINGE.
APPLICATION FILED SEPT. 20, 1919.

1,348,598.

Patented Aug. 3, 1920.

Inventor
Arthur J. Stretch
By his Attorney
Frank Warren

UNITED STATES PATENT OFFICE.

ARTHUR J. STRETCH, OF SEATTLE, WASHINGTON.

HINGE.

1,348,598.    Specification of Letters Patent.    Patented Aug. 3, 1920.

Application filed September 20, 1919. Serial No. 325,251.

*To all whom it may concern:*

Be it known that I, ARTHUR J. STRETCH, a citizen of the United States, residing at Seattle, in the county of King and State of Washington, have invented a certain new and useful Improvement in Hinges, of which the following is a specification.

My invention relates to improvements in hinges and the object of my invention is to provide a friction hinge that is adapted to be used on the wind shields of motor vehicles, the friction being adjustable from a position where it will permit a substantially free and unrestricted movement of the hinge to a position where the hinge is substantially locked.

A further object is to provide a hinge of this type that is inexpensive to manufacture, simple and durable in its plan of construction and easy to install on windshields of motor vehicles.

My invention consists in the novel construction, adaptation and combination of parts of a frictional hinge as will be more clearly hereinafter described and claimed.

I accomplish these objects by devices illustrated in the accompanying drawings wherein Figure 1 is a view in front elevation of a hinge constructed in accordance with my invention as it may appear when in use, a fragment only of the windshield and bracket that supports the same being shown.

Figure 1:
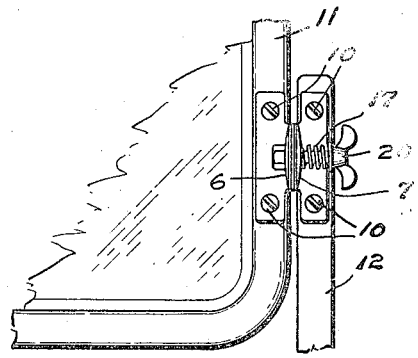

Referring to the drawings, throughout which like reference numerals indicate like parts, the numerals 6 and 7 designate two concavo-convex plates whose outer portions are circular or rounded in shape and whose inner portions merge into and are integral with base members 8 that lie in planes at substantially right angles of the plates 6 and 7 and protrude from the outer or convex sides thereof.

The base members 8 are perforated for the reception of screws or bolts 10 by which they may be secured to the frame 11 of a windshield or to the bracket 12 or equivalent device that supports such windshield.

Figure 3:
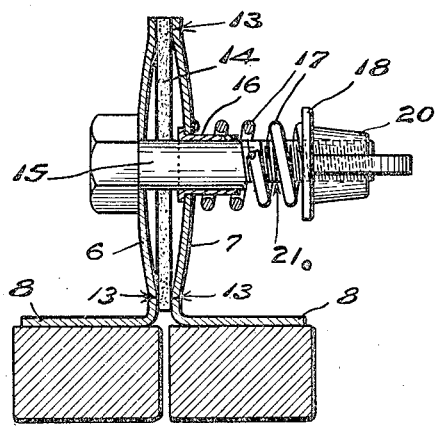
Fig. 3 is an enlarged view in cross-section substantially on a broken line 3, 3 of Fig. 2, certain parts being shown in elevation.
Figure 2:
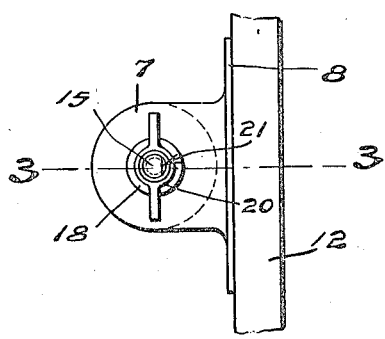
Fig. 2 is a view in side elevation of the hinge.
Figure 4:
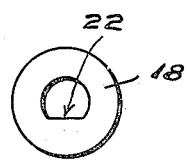
Fig. 4 is a detached plan view of a washer that is used in the construction of the hinge.

The inner concave sides of the plates 6 and 7 terminate in flattened annular bearing surfaces 13, as more clearly shown in Fig. 3, that are adapted to frictionally engage with the sides of a washer or disk 14, of fiber or other similar material, near the periphery of such washer and at a distance from the pivot of the hinge.

The two plates 6 and 7 that form a hinge are substantially identical with each other and are provided with centrally located perforations through which a pivot bolt 15 passes.

The bolt 15 is provided with a flanged sleeve 16 that forms a bearing for the plate 7 opposite the head of the bolt and such bolt 15 is adapted to have a compression spring 17 placed thereover and arranged to bear against the hinge plate 7, the outer end of the spring 17 being adjustably held by a washer 18 and nut 20.

The end of the bolt 15 is threaded in the usual manner for the reception of the nut 20 and one side of such bolt 15 is flattened, as at 21 to fit the flattened side 22 of the perforation in the washer 18 and by which the washer 18 is prevented from turning when the nut is screwed onto or off of the bolt 15.

If desired the two plates 6 and 7 of each hinge may be made exact duplicates of the hole in the center of the plate 6 being made the same size as the corresponding hole in the plate 7 so that it will be large enough to receive the sleeve 16.

The plates 6 and 7 are preferably stamped out of sheet metal so that they will have some resiliency within themselves.

When the nut 20 is loose the plates 6 and 7 will turn freely with respect to each other but as the nut is tightened against the spring 17 the plates 6 and 7 are caused to bind frictionally on the fiber disk 14 thereby causing the hinge to resist movement, the frictional resistance of the hinge being directly proportional to the pressure of the spring 17.

If the nut 20 is turned far enough onto the bolt 15 so that the convolutions of the spring are entirely closed and rest one against the other, then the friction between the two plates 6 and 7 and the friction disk may become so great as to substantially form a lock that will prevent any movement of the hinge.

Figure 5:
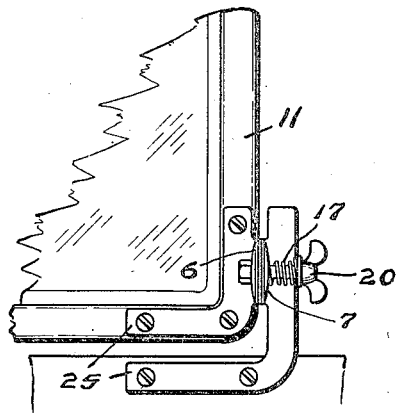
Fig. 5 is a view similar to Fig. 1, showing a slightly modified form of hinge.

The hinge shown in Fig. 5 is identical with the hinge shown in Figs. 1 to 4, inclusive, except that the base members 25, which correspond to the hinge shown in Figs. 1 to 4 are made in substantially the shape of a letter L to readily adapt them to fit in certain locations where these hinges may be used.

It is obvious that changes may be made in the forms, dimensions, and arrangement of parts of my invention without departing from the spirit thereof.

What I claim is:

A hinge of the class described, comprising two concavo-convex plates, the concave sides of said plates each having an annular flattened friction surface and said plates being adapted to be disposed side by side with the concave surfaces turned toward each other, integral base members arranged at right angles to said plates and protruding from the convex sides thereof, a friction disk interposed between said plates and arranged to be engaged by the flattened friction surfaces of said plates, a pivot bolt extending transversely through said plates, a flanged sleeve on said pivot bolt to serve as a bearing for the plate opposite the head of said bolt, a washer on said bolt, means for preventing said washer from turning, a helical compression spring interposed between said washer and the side of one of said plates, and a nut arranged to screw against said washer.

In witness whereof I hereunto subscribe my name this 10th day of September, A. D. 1919.

WILLIAM H. ZORGER.

It is hereby certified that the signature of the patentee at the end of the printed specification in Letters Patent No. 1,348,598, granted August 3, 1920, upon the application of Arthur J. Stretch, of Seattle, Washington, for an improvement in "Hinges," was erroneously printed as "William H. Zorger," whereas said signature should have been printed as *Arthur J. Stretch;* and that the said Letters Patent should be read with this correction therein that the same may conform to the record of the case in the Patent Office.

Signed and sealed this 5th day of October, A. D., 1920.

[SEAL.]

M. H. COULSTON,
*Acting Commissioner of Patents.*

Cl. 296—92.